Jan. 15, 1935.  S. P. ORLANDO  1,988,085
STRUCTURAL JOINT
Filed Oct. 20, 1932
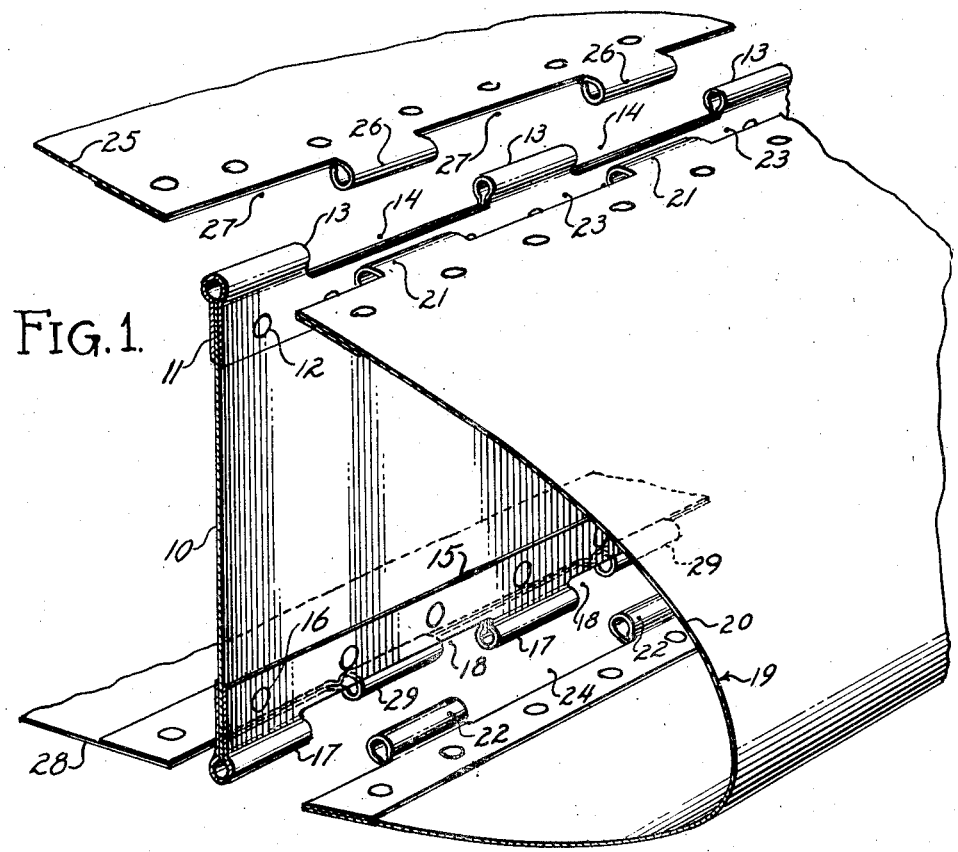
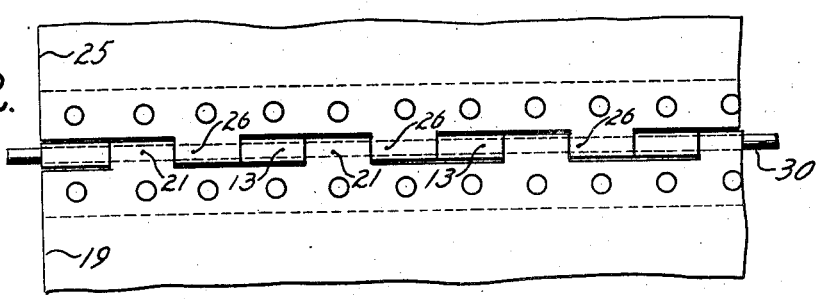
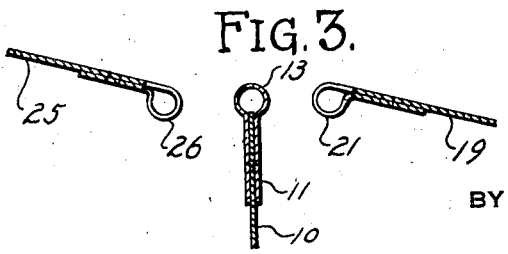
INVENTOR
SALVATORE P. ORLANDO.
BY HIS ATTORNEY Patented Jan. 15, 1935

1,988,085

UNITED STATES PATENT OFFICE 1,988,085

STRUCTURAL JOINT

Salvatore P. Orlando, Brooklyn, N. Y., assignor to Curtiss Aeroplane & Motor Company, Inc., a corporation of New York Application October 20, 1932, Serial No. 638,721

2 Claims. (Cl. 244—31)

This invention relates to improvements in structural joints, and is particularly adapted to the construction of control surfaces in aircraft. Many present-day aircraft are provided with metallic control surfaces, such control surfaces having great strength and being comparatively simple of manufacture and light in weight. My invention provides for the simplification of the construction of such metallic control surfaces and may likewise be adapted to the construction of other aircraft parts such as wings, cowlings, fairings and the like.

Generally, my construction provides for the formation at the edges of various surfaces to be joined of a series of spaced hollow beads, along the order of the several members of a piano hinge. The beads of one member are placed in the spaced portions between the beads of one or more of the other members. All of the hollows of the beads are assembled in axial alinement, whereupon, a mandrel is inserted through all of the bead hollows, thus holding the members rigidly together. By forming such a hinged joint at two edges of a member of an aircraft structure, the member is held rigidly with respect to those members to which it is joined, and no relative motion between the members would be permitted.

An object of the invention is to simplify the construction and assembly of aircraft control surfaces fabricated from metal. A further object is to provide a structure which may be easily disassembled for inspection and repair.

Further objects will be apparent from a reading of the subjoined specification and claims and from a consideration of the accompanying drawing.

In order to explain the invention more clearly, an embodiment thereof is shown in the accompanying drawing, in which similar numbers indicate similar parts, and in which:

Fig. 1 is a perspective view of portions of the several members to be joined, in position for final assembly;

Fig. 2 is a plan of a typical hinged joint of the invention; and

Fig. 3 is a section of three members to be joined, in position for final assembly.

Describing the invention in greater detail, 10 is a transverse beam member of an airfoil. Along the upper transverse edge of the beam 10 is attached a metal strip 11 by rivets 12, or other suitable fastening means. The strip 11 is bent in the form of a U, and at the bend a series of hollow beads 13 are formed, the space 14 between the beads being cut away, so that the beads 13 are proportioned to have a length of approximately one-half the space between the ends of succeeding beads. Along the lower transverse edge of the beam 10, a strip 15, formed in identically the same manner as the strip 11, is attached as by rivets 16. Thus, a series of beads 17 with spaces 18 between them are formed along the lower transverse edge of the beam 10.

A nose piece 19 having a convex portion 20 is bent back upon itself at its upper and lower edges to form a series of hollow beads 21 along the upper edge, and 22 along the lower edge. The material between the beads 21 and 22 is cut away to form spaces 23 and 24, resulting in a series of hollow spaced beads 21 along the upper edge of the nose piece 19, and a series of hollow spaced beads 22 along the lower edge of the nose piece 19. The beads 21 and 22 are formed of substantially similar length to the beads 13 and 17 of the beam 10.

A rearwardly extending cover plate 25 has formed at its forward edge a series of spaced hollow beads 26, these beads being formed in exactly the same manner as the beads 21 and 22 of the nose piece 19. The beads 26 are of substantially similar length as the beads 13 and 21, and the spaces 27 between the beads 26 are substantially twice the length of each bead 26. A lower cover plate 28 has formed at the forward edge thereof a series of spaced hollow beads 29 exactly similar in detail to the beads 26 of the upper cover plate 25.

Assembly of the air foil is effected by alining the hollows of the beads 13, 21 and 26 as shown in Fig. 2, the beads fitting together as a result of a proper spacing of the beads, wherein the length of each bead is substantially one-half of the intervening space between the beads. Upon alinement of the hollow beads of the three members, a mandrel 30 may be inserted through the hollows of all the beads, thus holding the nose piece 19 and the upper cover plate 25 in fixed relation to the beam 10. The beads 22 at the lower edge of the nose piece 19, and the beads 29 of the lower cover plate are then alined with the beads 17 at the lower edge of the beam in a similar manner to that above described in connection with the upper edge of the beam 10, and a mandrel similar to the mandrel 30 can then be inserted through the hollows of the beads 17, 22 and 29, holding the lower edge of the nose piece 19, and the lower cover plate 28 in fixed relation to the beam 10. The rearward edges of the cover plates 25 and 28 may then be drawn together and fastened by externally applied rivets.

It will be seen from the description of the construction of the joint, that the beam 10 may be constructed as a unit prior to assembly, and the rivets or fastening means 12 and 16 of the beam 10 may be inserted as a manufacturing operation on stationary equipment adapted to apply such fastening means rapidly, effectively and cheaply. Likewise, the rivets or fastening means for forming the beads 21, 26, 22 and 29 may be applied by stationary machinery adapted to accomplish the operation cheaply and quickly. After such operations have been completed, there is no further need for machine operations in the assembly of the final joint or in the assembly of the complete airfoil section, the only requirement remaining being to assemble the various units in proper relation to each other, whereupon the mandrels similar to the mandrel 30 are inserted through the hollow beads to complete the assembly of the units. This construction lends itself admirably to aircraft construction and eliminates the tedious processes involved in riveting metal cover surfaces to beam structures. In such older forms of construction, difficulties often arise in properly applying the rivets, through the fact that the spaces within the structure are difficult of access for bucking rivets and for effecting proper alinement of the various parts comprising the final airfoil section.

The construction covered by this invention is particularly adapted for use with ailerons, vertical fins, horizontal stabilizers, rudders and elevators of airplanes.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an airfoil structure, in combination, a beam comprising a vertical strip, spaced hollow beads along both the upper and lower edges of said strip, a convex nose piece having spaced hollow beads along each edge thereof, one edge extending upwardly and rearwardly to permit the beads of that edge to engage the inter-bead spaces of the upper edge of said beam, and the other edge of said nose piece extending downwardly and rearwardly to permit the beads of said latter edge to engage the inter-bead spaces of the lower edge of said beam, a mandrel engaging within the aligned beads of said beam and said nose piece at the upper edge of said beam and a second mandrel engaging within the aligned beads of said beam and said nose piece at the lower edge of said beam.

2. In an airfoil structure, in combination, a beam comprising a vertical strip, spaced hollow beads along the upper and lower edges of said strip, a convex nose piece having an upper rearward edge formed with spaced hollow beads engageable in the inter-bead spaces at the upper edge of said beam, said nose piece having a lower rearward edge formed with spaced hollow beads engageable in the inter-bead spaces at the lower edge of said beam, an upper rearwardly extending cover plate having its forward edge formed with spaced hollow beads engageable in the inter-bead spaces of the upper edge of said beam and the upper rearward edge of said nose piece, a lower rearwardly extending cover plate having its forward edge formed with spaced hollow beads engageable in the inter-bead spaces of the lower edge of said beam and the lower rearward edge of said nose piece, a mandrel passing through the beads of the upper beam edge, the upper nose piece edge and the upper cover plate, and a mandrel passing through the beads of the lower beam edge, the lower nose piece edge and the lower cover plate.

SALVATORE P. ORLANDO.